US007268672B2

(12) United States Patent
King

(10) Patent No.: US 7,268,672 B2
(45) Date of Patent: Sep. 11, 2007

(54) SYSTEM FOR PROVIDING A TACTILE STIMULATION IN RESPONSE TO A PREDETERMINED ALARM CONDITION

(76) Inventor: Quentin King, 10 Wallaroy Street, Concord West, NSW (AU) 2138

( * ) Notice: Subject to any disclaimer, the term of this patent is extended or adjusted under 35 U.S.C. 154(b) by 191 days.

(21) Appl. No.: 10/510,381

(22) PCT Filed: Apr. 4, 2003

(86) PCT No.: PCT/AU03/00107

§ 371 (c)(1),
(2), (4) Date: Feb. 10, 2005

(87) PCT Pub. No.: WO03/088172

PCT Pub. Date: Oct. 23, 2003

(65) Prior Publication Data

US 2005/0162258 A1 Jul. 28, 2005

(30) Foreign Application Priority Data

Apr. 5, 2002 (AU) ..................................... PS1577

(51) Int. Cl.
*H04B 3/36* (2006.01)

(52) U.S. Cl. .............................. 340/407.1; 340/539.1; 340/539.11; 340/573.1; 340/825.19

(58) Field of Classification Search ............ 340/407.1, 340/539.1, 539.11, 539.12, 573.1, 825.19, 340/286.07
See application file for complete search history.

(56) References Cited

U.S. PATENT DOCUMENTS

| | | | |
|---|---|---|---|
| 4,380,759 A | 4/1983 | Sulkoski et al. | |
| 5,534,851 A * | 7/1996 | Russek | 340/573.4 |
| 5,555,891 A | 9/1996 | Eisenfeld | |
| 6,218,958 B1 * | 4/2001 | Eichstaedt et al. | 340/7.6 |
| 6,364,834 B1 * | 4/2002 | Reuss et al. | 600/300 |
| 6,850,150 B1 * | 2/2005 | Ronkainen | 340/7.58 |

FOREIGN PATENT DOCUMENTS

| | | |
|---|---|---|
| CA | 2159439 | 4/1996 |
| EP | 1100060 A2 | 5/2001 |
| JP | 8-161680 | 6/1996 |
| WO | WO-94/18652 | 8/1994 |
| WO | WO-97/16035 A1 | 5/1997 |
| WO | WO-01/20368 A1 | 3/2001 |

* cited by examiner

*Primary Examiner*—Daryl C Pope
(74) *Attorney, Agent, or Firm*—Morrison & Foerster LLP

(57) ABSTRACT

There is provided a tactile alarm system for use in environments having a plurality of audio and/or visual alarms each in communication with a detector measuring a predetermined physical property. The system includes one or more tactile alarms each connected to a different person and each configured to provide tactile stimulation to the person when one or more predetermined physical property falls outside a predetermined range.

22 Claims, 3 Drawing Sheets

SYSTEM FOR PROVIDING A TACTILE STIMULATION IN RESPONSE TO A PREDETERMINED ALARM CONDITION

FIELD OF THE INVENTION

The present invention relates to alarm systems and in particular to a system for providing tactile stimulation in response to a predetermined alarm condition.

The invention has been developed primarily for use in medical operating theatres and will be described hereinafter with reference to this application. However, it will be appreciated that the invention is not limited to this particular field of use.

BACKGROUND OF THE INVENTION

In a wide variety of industries and professions, detectors are used to measure physical properties of interest. When one or more of these properties exceed a predetermined range, an alarm condition is signaled to one or more audible and/or visual alarms which respond by activating. For example, in a surgical operating theatre two audible and/or visual alarms can activate in response to two detected properties falling outside their predetermined ranges. In such a case, a plurality of practitioners who may be present in the theatre simultaneously to perform their respective roles are subject to both activated alarms.

During a surgical operation detectors are connected to the patient so as to measure physical properties of the patient which can include heart rate, blood oxymetry, temperature, blood pressure, ECG or other predetermined properties. It may be that different practitioners involved in the surgery are interested in monitoring different properties of the patient depending on their role in the surgery. For example, an anesthetist may be interested in monitoring the patient's heart-rate and blood pressure whereas another practitioner may only be interested in closely monitoring the quantity of a particular chemical in a patients blood.

Presently, all monitored information is available to all members of the surgical team including nursing staff even though they may not have a specific interest in monitoring a particular measured physical property to perform their duties.

Of these measured properties, it is normally the case that when they rise above or fall below a predetermined value or outside a predetermined range, an alarm condition is generated by processing electronics connected to the output of the detectors. Such alarm conditions are provided in the form of an audible and/or visual alert. For example, a visual alarm may appear or flash on a video display unit and/or an audible alarm associated with the display will activate when a measured property falls outside a predetermined range. These alarms are provided for all members of the surgical team and nursing staff and do not discriminate by providing an alarm signal to specific members of the surgical or nursing staff present in an operation. That is, all present personnel will be subject to audible and/or visual alarms when they activate.

In such situations where all members of the operating theatre are subject to those activated alarms, some personnel can either be distracted by them or alerted to an alarm condition that is not of specific interest to them. For example, the activation of an audible or visual alarm in response to a property not of specific interest to a surgeon may cause a distraction which is very undesirable.

In practice, it is common to avoid the interference and distractions caused by the activation of alarms, especially audible alarms, by turning them off or down in magnitude prior to or during a surgery. Notwithstanding that this prevents unnecessary distractions when alarm conditions occur, it defeats the purpose of employing an alarm especially when it is turned off.

It is also well known that medical practitioners and, in particular, junior practitioners are subject to relatively long hours of work. In some cases, a practitioner will only have a very specific role during a surgery, for example an anesthetist, who is only looking at particular vital signs of a patient, often on a monitor which cannot be directly seen from their preferred observation position of the patient without moving. After long periods of time it is not unknown for a practitioner to lose concentration or even fall asleep where audible or visual alarms become ineffective and they may remain unaware of the existence of an alarm condition for an undesirable period of time.

In other fields of endeavour, for example aircraft piloting, a pilot has many tasks to perform sometimes simultaneously wherein the activation of an alarm condition corresponding to a system of the aircraft may go unnoticed for some time. In the specific case of combat pilots who experience high gravitational forces, audible and/or visual signals may not be as efficiently processed by the brain than at normal G-forces and visual alarm signals can be difficult to interpret.

In the case of commercial pilots, a loss of cabin pressure of an aircraft when it is at a high altitude is communicated to a pilot by means of an audible or visual alarm which activates when the pressure falls below a predetermined level. When the cabin pressure falls slowly, it is common for a pilot to be practically unconscious when the alarms are activated. Coupled with the plethora or other audible and visual systems in an aircraft, the pilot in these situations often does not heed the alarms which may have fatal results.

OBJECT OF THE INVENTION

It is an object of the invention to provide a system for providing tactile stimulation which will overcome or substantially ameliorate at least some of the deficiencies of the prior art, or to at least provide an alternative.

SUMMARY OF THE INVENTION

According to first aspect of the invention there is provided a tactile alarm system for use in environments having a plurality of audible and/or visual alarms, the tactile alarm system including:

a plurality of detectors receiving input representative of a plurality of predetermined physical properties, each detector having an output to actuate one of more of the plurality of audible and/or visual alarms when one or more of the detected physical properties falls outside a predetermined range, the alarm system being characterised by a tactile alarm connected to a person and being in communication with the output of one or more detectors, the tactile alarm being actuated in response to selected ones of the plurality of predetermined physical properties falling outside their respective predetermined ranges.

Preferably, the output of each detector is communicated to the tactile alarm by radio frequency radiation. Further, the system can have a monitor disposed intermediate the output of each detector and the tactile alarm and plurality of audible and/or visual alarms, the monitor processing the input from each detector and providing an activation signal to the one or more audible and/or visual alarms and the tactile alarm.

In a preferred implementation, the tactile alarm is in the form of a strip having a receiver for receiving the signals to activate the tactile alarm. In some embodiments, the strip is divided into segments wherein each segment corresponds to a different predetermined property to provide a tactile alarm signal to the person when an actuation signal provided in one segment corresponds to a particular predetermined property falling outside its predetermined range.

The tactile alarm preferably provides stimulation being selected from the group consisting of hot or cold sensations, electrical stimulation, and vibration stimulation. Preferably also, the tactile alarm provides pulses that are coded by modulating their intensity or amplitude, or modulating their frequency. Alternatively, the tactile alarm may provide pulses that are coded such that a particular coding corresponds to a predetermined physical property. More preferably, the coding of the tactile alarm pulses varies proportionally with a predetermined property as it falls outside its predetermined range.

In use, the tactile alarm is preferably connected to a finger, wrist, forearm, chest, forehead, neck, shoulder, back, leg or foot of the person.

In some embodiments, the tactile alarm system includes a self tester which provides an indication of the operability of the tactile alarm system. Additionally, the tactile alarm system can include a failure alert which is actuated in response to a failure in the tactile alarm system to activate the tactile alarm in response to a predetermined property falling outside its predetermined range.

In preferred embodiments, the plurality of audible and/or visual alarms can be deactivated so that only the tactile alarm is capable of activating.

Preferably, the predetermined physical properties include temperature, blood pressure, mass, length measurements, ECG data, oxymetry data, movement, electrical current or voltage, velocity, acceleration, ionising or non-ionising radiation, pressure, time or optical intensity.

In other embodiments of the invention, the tactile alarm system includes a plurality of tactile alarms such that each tactile alarm is disposed on a different person and wherein each tactile alarm is configured to activate in response to a predetermined one or more of the physical properties measured by the detectors of interest to each person.

According to another aspect of the invention there is provided a method of employing a tactile alarm system in accordance with the first aspect of the invention or any one of its preferments, the method including the steps of:

- detecting the plurality of predetermined physical properties and generating detector signals being indicative of the properties;
- communicating the detector signals to a plurality of audible and/or visual alarms such that when one or more of the physical properties falls outside a predetermined range, one or more of the audible and/or visual alarms is activated; and
- disposing a tactile alarm on a person wherein the tactile alarm is in communication with the detector signals and wherein the tactile alarm is activated in response to a selected one or more of the predetermined physical properties falling outside their predetermined range.

Preferably, the method includes the step of communicating the detector signals by radio frequency radiation. Preferably also, the method includes the steps of:

- disposing a monitor intermediate the detectors and the plurality of audible and/or visual alarms;
- processing the detector signals at the monitor; and
- providing one or more of the plurality of audible and/or visual alarms and the tactile alarm with an alarm activation signal.

In preferred embodiments, said method includes the steps of providing a plurality of tactile alarms and configuring each tactile alarm to activate in response to a predetermined one or more of the detected physical properties falling outside their predetermined ranges.

DESCRIPTION OF THE FIGURES

A preferred embodiment of the invention will now be described, by way of example only, with reference to the accompanying drawings in which.

DETAILED DESCRIPTION OF THE PREFERRED EMBODIMENTS

Figure 1:
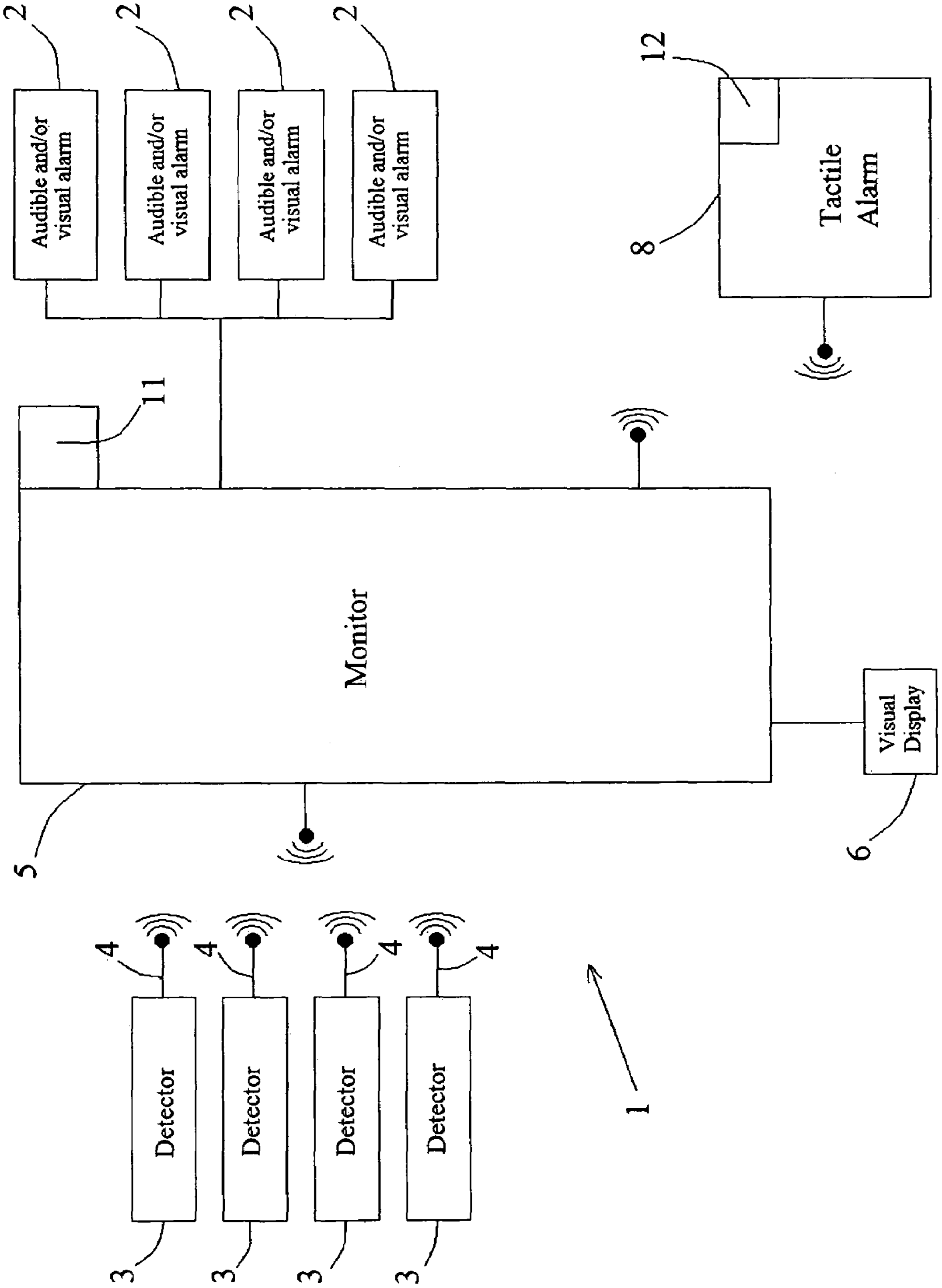
FIG. 1 is a schematic representation of the tactile alarm system of one embodiment.

Referring to FIG. 1 there is illustrated a tactile alarm system 1 for use in environments having a plurality of audible and/or visual alarms 2. The tactile alarm system 1 includes a plurality of detectors 3 receiving input representative of a plurality of predetermined physical properties. These properties include temperature, pressure, and electrical current and voltage.

Each detector 3 includes an output 4 which communicates a signal representative of the measured physical properties to a monitor 5 by means of radiofrequency radiation. The monitor 5 processes the signals provided by the detectors and displays on a visual display unit 6 a quantification of each of the measured physical properties. That is, the measured values of the properties are displayed on a visual display unit 6 associated with the monitor 5.

The plurality of audible and/or visual alarms 2 and 6 of the tactile alarm system 1 are in communication with the monitor 5 such that when one or more of the detected physical properties fall outside a predetermined range, the audible or visual alarms receive a signal from the monitor 5 which activates one or more of the alarms 2 and provides a display accordingly on the visual display unit 6.

A tactile alarm 8 is connected to the skin of a person on their forearm (not illustrated). When selected ones of the plurality of predetermined physical properties fall outside their respective predetermined range, the monitor 5 provides a tactile alarm signal to the tactile alarm 8 thereby actuating it.

The tactile alarm 8 is in the form of a strip having an RF receiver for receiving RF signals communicated from the monitor 5. The RF signals are representative of the detected physical properties falling outside the predetermined range so as to activate the tactile alarm 8.

When a measured physical property falls outside a predetermined range the monitor 5 provides an activation signal to tactile alarm 8 which in turn provides an electrical stimulation signal to the person on their forearm adjacent the tactile alarm strip 8.

The electrical stimulation signal applied to the person is coded by modulating its intensity or amplitude, however, in other embodiments, the frequency of the electrical stimulation signal is modulated.

The coded electrical stimulation signals are coded so that a particular coding of a stimulation signal corresponds to a measured predetermined physical property such that the person being stimulated with such a coded signal will be cognizant of the predetermined physical property that has fallen outside its predetermined range.

Although not illustrated, the tactile alarm 8, being in the form of a strip, is divided into segments wherein each segment is in communication with the monitor 5 and responsive to a different predetermined measured physical property. When one of these predetermined physical properties falls outside its predetermined range, the segment corresponding to that predetermined property will provide the coded electrical stimulation signal to the forearm of the person.

Figure 2:
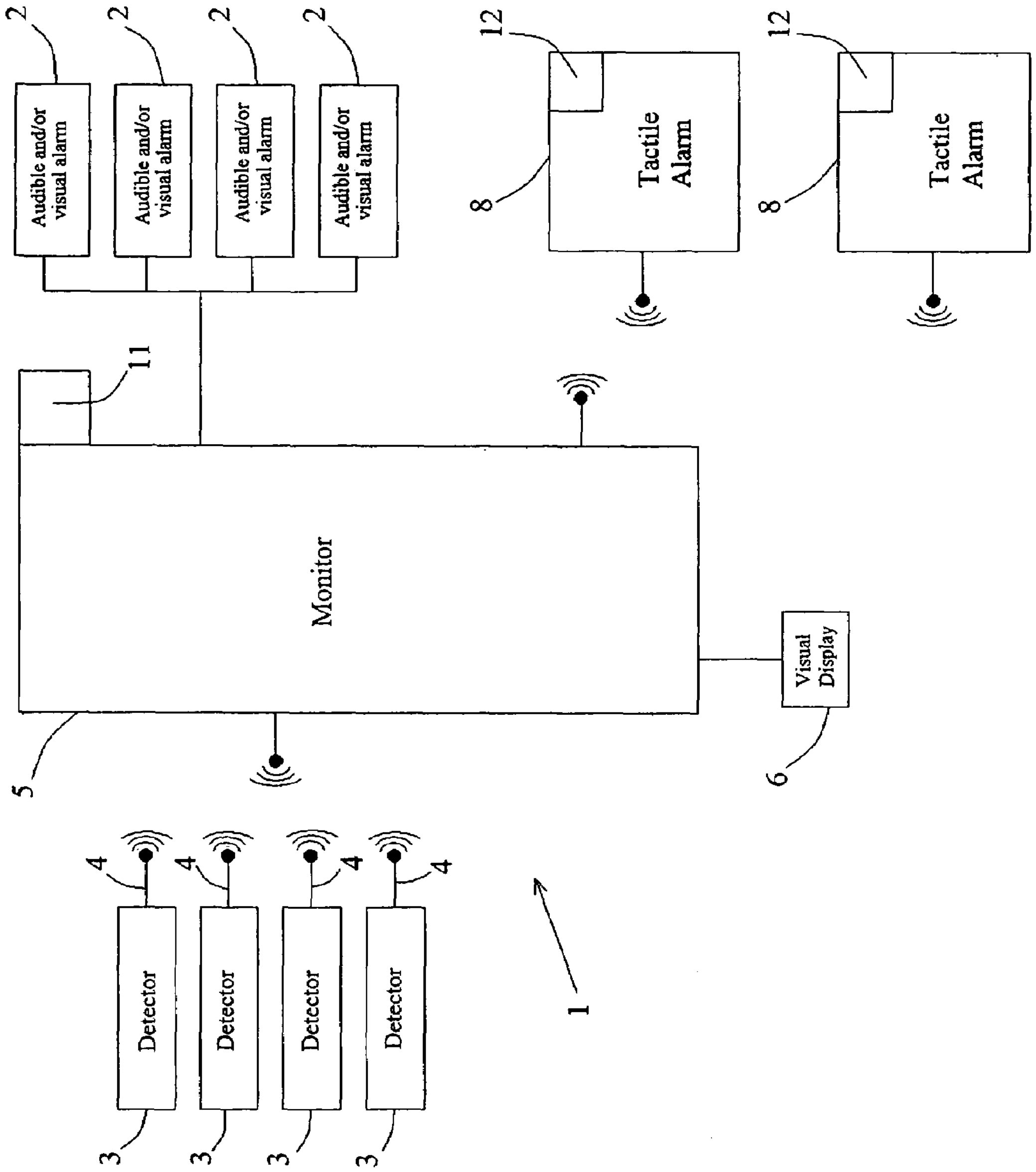
FIG. 2 is a schematic representation of an alternative embodiment of the tactile alarm system.

Referring to FIG. 2, there is illustrated a plurality of tactile alarms 8 connected to the skin of a different person (not illustrated). Each of the tactile alarms 8 is configured to activate in response to one or more of the physical properties measured by the detectors falling outside their predetermined range. That is, one person may have a tactile alarm 8 disposed to their forearm wherein the tactile alarm 8 has two segments which are responsive to detected pressure and temperature and another tactile alarm 8 connected to the skin of another person is configured to be responsive to electrical current and voltage. Therefore, each person connected to a tactile alarm 8 will be alerted by tactile stimulation only in response to predetermined measured physical properties of interest to them.

The tactile alarm system 1 further includes a self testing mechanism 11 which provides a user with an indication of the operability of the tactile alarm system 1 to respond in the event one or more predetermined properties fall outside a predetermined range. Similarly for the case of a failure being present in the tactile alarm system 1, a failure alert 12 is provided to alert a person by providing electrical stimulation signals that the tactile alarm system 1 has failed in some way. For example, the failure alert 12 will actuate when a detector output is not connected to the monitor or if the monitor 5 is not in communication with the tactile alarm 8.

In some situations, the plurality of audible and/or visual alarms 2 can be deactivated so that only a tactile alarm signal is provided to a person in response to a predetermined measured physical parameter falling outside a predetermined range. That is, only the tactile alarm 8 is configured for providing an alarm.

In other embodiments of the invention, properties in addition to the detection of temperature, pressure and electrical current and voltage, other physical properties such as ECG data, oxymetry data, mass, length measurements, movement, velocity, acceleration, ionising or non-ionising radiation, blood pressure, time or optical intensity can be measured.

Although it is described that the tactile alarm 8 is connected to the forearm of the person, the tactile alarm 8 can be connected to the person at their fingers, wrists, chest, forehead, neck, shoulders, back, legs and feet. Furthermore, the tactile alarm 8 can be connected to the skin of the person directly or through clothing, gloves or other apparel worn by the person.

The tactile alarm 8 is described in the form of a strip form and it will be appreciated that in other embodiments the tactile alarm 8 can be a circularly shaped disc or other predetermined shape configured to be connected to the person.

The tactile alarm 8 delivers an electrical stimulation signal to the person, however, in other embodiments vibration stimulation or hot or cold sensations can alternatively be delivered.

In embodiments where the electrical stimulation signal provided by tactile alarm 8 is not coded by modulating its intensity or amplitude, the intensity or amplitude of this signal can be varied proportionally with the predetermined property falling outside its predetermined range. For example, the stronger the intensity of the electrical stimulation signal applied to the person, the further outside the predetermined range the property has fallen.

Figure 3:
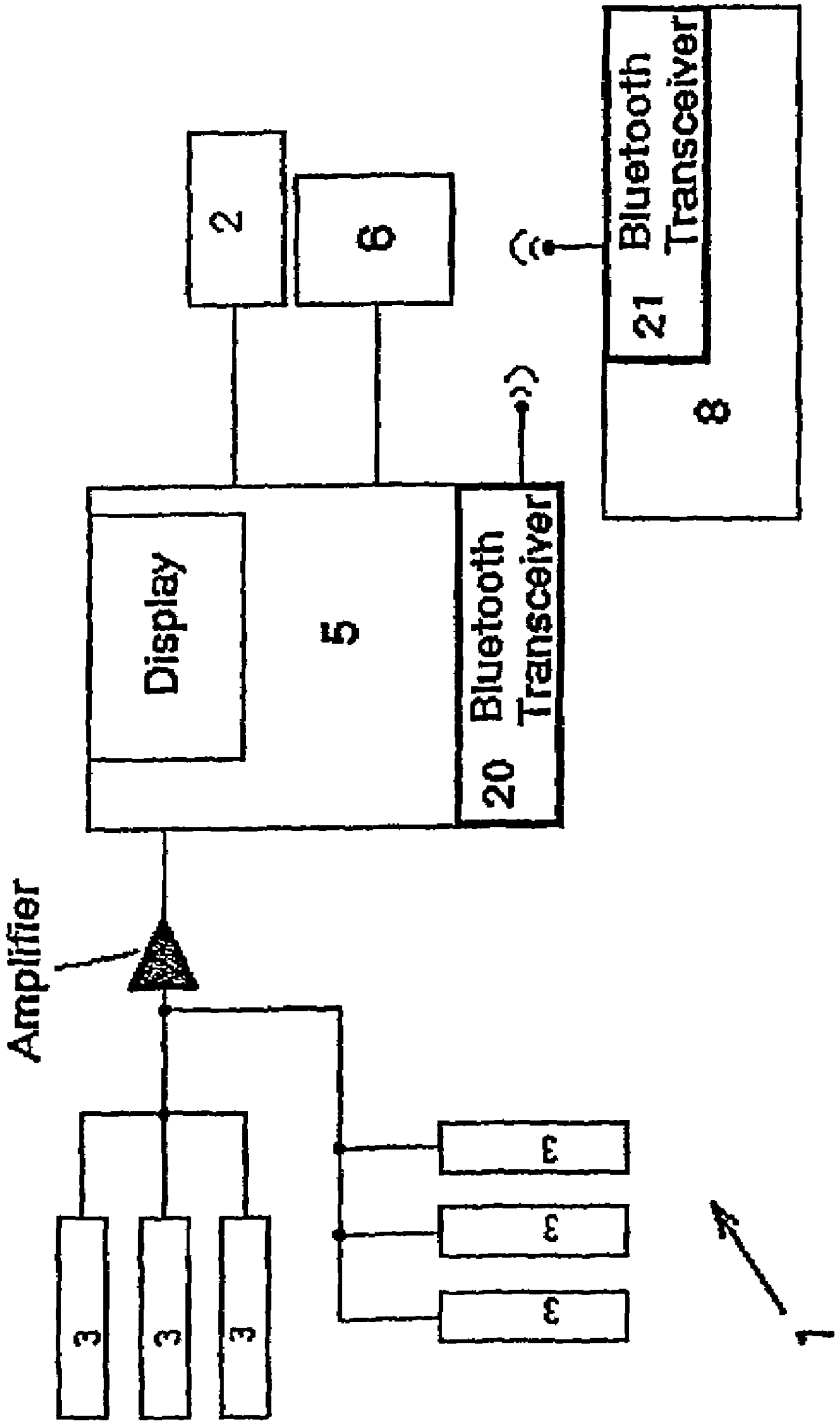
FIG. 3 is a schematic representation of an another embodiment of the tactile alarm system

Referring to FIG. 3, where like numerals denote like components, there is illustrated another embodiment in which the tactile alarm system 1 is connected to a surgeon (not illustrated) in an operating theatre. In this embodiment, a patient undergoing surgery has detectors 3 measuring physical properties including blood pressure, heart rate and blood oxymetry. Other detectors 3 are also present which sense the status of functions of vital equipment, for example the performance of an exposed element organ machine.

The detected signals are then amplified and communicated to a monitor unit 5 by means of a cable connection. However, RF or infra-red communication between the detectors 3 and the monitor unit 5 can also be employed. Processing electronics (not illustrated) are disposed within the monitor 5 for processing the amplified detector signals. The monitor 5 is configured to display an indication of the magnitude of the detected signals. For example, the monitor 5 will display the detected heart rate as a function of time.

The monitor 5 is programmable such that when the detected signals correspond to the measured physical properties falling outside a predetermined range, a visual alarm 6 and an audible alarm 2 are activated. The audible and visual alarms 2 and 6 are connected to the monitor 5 by means of a cable, however, an RF or infra-red connection may suitably be employed.

Once one of the physical properties of interest falls outside its predetermined range and the audible and visual alarms 2 and 6 are activated, an alarm signal is sent to a tactile alarm 8 in contact with the skin of the surgeon (not illustrated). As already noted above, the tactile alarm 8 can be worn on practically any preferred body part of a person.

The alarm signal is communicated to the tactile alarm 8 by RF radiation. A bluetooth™ transceiver 20 is disposed in the monitor 5 and communicates with another bluetooth™ transceiver 21 located in or adjacent the tactile alarm 8. Although the bluetooth™ RF communication means is illustrated, any suitable RF communication means can be used.

Once an alarm signal is received by the tactile alarm 8, a processor (not illustrated) in communication with the transceiver 21 activates the tactile alarm 8. Once activated, a tactile pulse is delivered to the member of the surgical team.

Either of the processor or processing electronics of the monitor 5 are capable of being configured to activate the tactile alarm 8 only when a selected one or ones of the measured physical properties fall outside their predetermined range.

The actual type of stimulation provided by the tactile alarm signal provided to the person is selected at the monitor 5 or the processor. For example, the tactile alarm 8 can deliver a tactile stimulation signal to the person in the form of electrical stimulation, vibration stimulation or hot or cold sensations.

The tactile stimulation signal applied by tactile alarm 8 to the person can be continuous at a constant intensity or, alternatively, it can be coded by modulating its intensity or amplitude. For example, the intensity or amplitude of the applied signal can be varied proportionally with the predetermined property falling outside its predetermined range. That is, the stronger the intensity of the electrical stimulation signal applied to the person, the further outside the predetermined range the property has fallen. Similarly, the magnitude of the frequency of the applied signals can be representative of the amount by which a property falls outside its predetermined range.

As with the tactile alarm described above, the embodiment of FIG. 3 can be modified such that the detected properties bypass the monitor 5. In such cases, the detectors each include a bluetooth™ transceiver which communicates directly with the transceiver 21 disposed in the tactile alarm 8.

In the operating theatre embodiment of FIG. 3, a separate tactile alarm 8 can be connected to another person or persons in the operating theatre wherein each separate tactile alarm 8 can be configured to provide a tactile alarm signal to the wearer when a predetermined one or ones of the measured physical properties fall outside their predetermined range. In such cases, only those people interested in a particular property or properties will be alerted by the property or properties falling outside their predetermined ranges, which does not unnecessarily alert or distract other people.

The foregoing describes embodiments of a tactile alarm system for use in surgical operating theatres, however, it will be appreciated by those skilled in the art that the tactile alarm system can be used in other fields, for example by combat or commercial aircraft pilots and modifications, obvious to those skilled in the art, can be made to the tactile alarm without departing from the scope of the present invention.

The claims defining the invention are as follows:

1. A tactile stimulation system, comprising:

a plurality of detectors receiving input representative of a plurality of predetermined physical properties, each detector providing an output when one or more of the detected physical properties falls outside a predetermined range, a tactile alarm configured to be placed in contact with a skin surface on a subject to whom an output of the tactile alarm is to be provided and being in communication with the output of one or more of the detectors and to be actuated in response to selected ones of the plurality of predetermined physical properties falling outside their respective predetermined ranges;

wherein the tactile alarm is divided into physically discrete segments wherein each segment corresponds to a different predetermined property and provides tactile stimulation to the subject independently of other segments in response to an activation signal that corresponds to the predetermined property of the segment and a magnitude by which the predetermined property falls outside its predetermined range.

2. The tactile stimulation system of claim 1, wherein the output of each detector is communicated to the tactile alarm by radio-frequency radiation.

3. The tactile stimulation system of claim 1, further comprising a monitor disposed intermediate the output of each detector and the tactile alarm and a plurality of audible and/or visual alarms, the monitor processing the input from each detector and providing an activation signal to the one or more audible and/or visual alarms and the tactile alarm.

4. The tactile stimulation system of claim 1, wherein the tactile alarm is in the form of the strip having a receiver for receiving the signals to activate the tactile alarm.

5. The tactile stimulation system of claim 1, wherein the tactile alarm provides stimulation to the subject to apprise the subject of the falling of a predetermined property outside its predetermined range in the form of hot or cold sensations, electrical stimulation or vibration stimulation.

6. The tactile stimulation system of claim 1, wherein the tactile alarm is connected to a body part of the subject.

7. The tactile stimulation system of claim 6, wherein the body part is chosen from the group consisting of a finger, a wrist, a forearm, a chest, a forehead, a neck, a shoulder, a back, a leg and a foot.

8. The tactile stimulation system of claim 1, further comprising a self tester which provides an indication of the operability of the tactile stimulation system.

9. The tactile stimulation system of claim 1, further comprising a failure alert which is actuated in response to a failure in the tactile stimulation system to activate the tactile alarm in response to a predetermined property falling outside its predetermined range.

10. The tactile stimulation system of claim 1, further comprising a plurality of audible and/or visual alarms actuated by the detectors when one or more of the detected physical properties falls outside a predetermined range that are configured to be deactivated so that only the tactile alarm is capable of being activated.

11. The tactile stimulation system of claim 1, wherein the predetermined physical properties include temperature, blood pressure, mass, length measurements, ECG data, oxymetry data, movement, electrical current or voltage, velocity, acceleration, presence of ionizing and non-ionizing radiation, pressure, time or optical intensity.

12. A tactile stimulation system, comprising:

a plurality of detectors receiving input representative of a plurality of predetermined physical properties, each detector providing an output when one or more of the detected physical properties falls outside a predetermined range, a tactile alarm configured to be placed in contact with a skin surface on a subject to whom an output of the tactile alarm is to be provided and being in communication with the output of one or more of the detectors and to be actuated in response to selected ones of the plurality of predetermined physical properties falling outside their respective predetermined ranges;

wherein the tactile alarm is divided into physically discrete segments wherein each segment corresponds to a different predetermined property and provides tactile stimulation to the subject independently of other segments in response to an activation signal that corresponds to the predetermined property of the segment and a magnitude by which the predetermined property falls outside its predetermined range, and wherein the tactile alarm provides tactile pulses that are coded such that a particular coding corresponds to a predetermined physical property and wherein the coding of the pulses supplied to the segments varies in intensity or spatially over the tactile alarm proportionally with the predetermined property as it falls outside its predetermined range.

13. The tactile stimulation system of claim 12, wherein the tactile alarm provides stimulation pulses that are coded by modulating the frequency.

14. A tactile stimulation system, comprising:

a plurality of detectors receiving input representative of a plurality of predetermined physical properties, each detector providing an output when one or more of the detected physical properties falls outside a predetermined range, a plurality of tactile alarms each configured to be placed in contact with a skin surface on a plurality of subjects to whom an output of the tactile alarm is to be provided and being in communication with the output of one or more of the detectors and to be actuated in response to ones of the plurality of predetermined physical properties falling outside their respective predetermined ranges;

wherein each tactile alarm is divided into segments wherein each segment corresponds to a different predetermined property to provide a tactile stimulation system to the subject when an activation signal provided in one segment corresponds to a particular property falling outside its predetermined range.

15. A method of employing a tactile stimulation system comprising a plurality of detectors receiving input representative of a plurality of predetermined physical properties, each detector providing an output when one or more of the detected physical properties falls outside a predetermined range and a tactile alarm configured to be placed in contact with a skin surface on a subject to whom an output of the tactile alarm is to be provided and being in communication with the output of one or more of the detectors and to be actuated in response to selected ones of the plurality of predetermined physical properties falling outside their respective predetermined ranges; wherein the tactile alarm is divided into segments wherein each segment corresponds to a different predetermined property to provide a tactile stimulation system to the subject when an activation signal provided in one segment corresponds to a particular property falling outside its predetermined range, the method comprising:

detecting a plurality of predetermined physical properties and generating detector signals indicative of the properties;

disposing a tactile alarm on a subject wherein the tactile alarm is in communication with the detector signals and wherein the tactile alarm is activated in response to a selected one or more of the predetermined physical properties falling outside their predetermined range; and dividing the tactile alarm into a plurality of segments wherein each segment corresponds to a different property such that a tactile alarm signal is provided to the subject from a respective segment when a corresponding property falls outside its predetermined range.

16. The method of employing a tactile stimulation system of claim 15, wherein each tactile alarm is configured to provide tactile stimulation in the form of coded tactile stimulus in response to a corresponding property falling outside its predetermined range, the stimulus being coded depending on the property, the method including the step of applying a tactile alarm pulsed that varies in intensity or spatially over the tactile alarm proportionally with the predetermined property as it falls outside its predetermined range.

17. The method of employing a tactile stimulation system of claim 15, including the step of communicating the detector signals by radio-frequency radiation.

18. The method of employing a tactile stimulation system of claim 15, further comprising:

providing a plurality of audible and/or visual alarms such that when one or more of the physical properties falls outside a predetermined range, one or more of the audible and/or visual alarms is activated;

disposing a monitor intermediate the detectors and the plurality of audible and/or visual alarms communicating the detector signals to;

processing the detector signals at the monitor; and providing one or more of the plurality of audible and/or visual alarms and the tactile alarm with an alarm activation signal.

19. The method of employing a tactile stimulation system of claim 15, wherein the tactile alarm signal is selected from the group comprising hot or cold sensations, electrical stimulation and vibration stimulation.

20. The method of employing a tactile stimulation system of claim 19, further comprising coding the tactile alarm signal by modulating the signal intensity or frequency.

21. The method of employing a tactile stimulation system of claim 20, further comprising disposing the tactile alarm on a portion of the body of the subject selected from the group consisting of fingers, wrists, forearms, chests, foreheads, necks, shoulders, backs, legs and feet.

22. The method of employing a tactile stimulation system of claim 21, wherein the physical properties include temperature, blood pressure, mass, length measurements, ECG data, oximetry data, movement, of electrical current or voltage, velocity, acceleration, presence of ionizing and non-ionizing radiation, pressure, time or optical intensity.

* * * * *